US009316169B2

(12) United States Patent
Barth et al.

(10) Patent No.: US 9,316,169 B2
(45) **Date of Patent: *Apr. 19, 2016**

(54) METHOD FOR OPERATING AN INTERNAL COMBUSTION ENGINE

(71) Applicant: GE Jenbacher GmbH & Co OG, Jenbach (AT)

(72) Inventors: Christian Barth, Eicklingen (DE); Herbert Kopecek, Schwaz (AT); Nikolaus Spyra, Innsbruck (DE); Michael Waldhart, Telfs (AT)

(73) Assignee: GE JENBACHER GMBH & CO OG, Jenbach (AT)

( * ) Notice: Subject to any disclaimer, the term of this patent is extended or adjusted under 35 U.S.C. 154(b) by 323 days.

This patent is subject to a terminal disclaimer.

(21) Appl. No.: 13/964,362

(22) Filed: Aug. 12, 2013

(65) Prior Publication Data

US 2014/0052362 A1 Feb. 20, 2014

(30) Foreign Application Priority Data

Aug. 17, 2012 (AT) ..................................... 896/2012

(51) Int. Cl.
*B60T 7/12* (2006.01)
*F02D 41/30* (2006.01)
(Continued)

(52) U.S. Cl.
CPC .......... *F02D 41/3011* (2013.01); *F02D 35/023* (2013.01); *F02D 35/025* (2013.01);
(Continued)

(58) Field of Classification Search
CPC ............ F02D 35/0023; F02D 35/0046; F02D 35/023; F02D 35/025; F02D 41/1486; F02D 41/0027
See application file for complete search history.

(56) References Cited

U.S. PATENT DOCUMENTS

| | | | |
|---|---|---|---|
| 4,867,127 | A | 9/1989 | Quirchmayr et al. |
| 7,467,040 | B2 | 12/2008 | Ker et al. |

(Continued)

FOREIGN PATENT DOCUMENTS

| | | |
|---|---|---|
| CN | 102439280 | 5/2012 |
| CN | 102465775 | 5/2012 |

(Continued)

OTHER PUBLICATIONS

Neal C. Gallagher, Jr. et al., "A Theoretical Analysis of the Properties of Median Filters", IEEE Transactions on Acoustics, Speech and Signal Processing, IEEE Inc., New York, USA, vol. ASSP-29, No. 6, Dec. 31, 1981, pp. 1136-1141, XP002580384, ISSN: 0096-3518.

(Continued)

*Primary Examiner* — John Kwon
(74) *Attorney, Agent, or Firm* — Wenderoth, Lind & Ponack, L.L.P.

(57) ABSTRACT

A method for operating an internal combustion engine, in particular a gas engine, having at least three cylinders, wherein a cylinder-specific signal ($p_{max}$, E) is acquired from each of the at least three cylinders, wherein a reference value ($p_{median}$, $E_{median}$) is generated from the cylinder-specific signals ($p_{max}$, E), wherein at least one combustion parameter (Q, Z) of one of the at least three cylinders is controlled as a function of a deviation of the cylinder-specific signal of the one of the at least three cylinders ($p_{max}$, E) from the reference value ($p_{median}$, $E_{median}$), whereupon the cylinder-specific signal of the one of the at least three cylinders ($p_{max}$, E) follows the reference value ($p_{median}$, $E_{median}$), wherein a median of the cylinder-specific signals ($p_{max}$, E) is generated as the reference value ($p_{median}$, $E_{median}$).

20 Claims, 7 Drawing Sheets

(51) Int. Cl.

| | |
|---|---|
| ***F02D 41/00*** | (2006.01) |
| ***F02D 35/02*** | (2006.01) |
| *F02D 41/40* | (2006.01) |
| *F02D 19/02* | (2006.01) |
| *F02D 29/06* | (2006.01) |
| *F02D 37/02* | (2006.01) |

(52) U.S. Cl.

CPC .......... *F02D41/008* (2013.01); *F02D 41/0027* (2013.01); *F02D 19/024* (2013.01); *F02D 29/06* (2013.01); *F02D 37/02* (2013.01); *F02D 41/0085* (2013.01); *F02D 41/401* (2013.01)

(56) References Cited

U.S. PATENT DOCUMENTS

| | | | | |
|---|---|---|---|---|
| 7,957,889 | B2 | 6/2011 | Portin et al. | |
| 2007/0021901 | A1* | 1/2007 | Yamaguchi ........... | F02D 35/023 701/105 |
| 2008/0051975 | A1 | 2/2008 | Ker et al. | |
| 2009/0101110 | A1* | 4/2009 | Hathout ................ | F02D 35/023 123/406.43 |
| 2009/0132145 | A1* | 5/2009 | Angeby .................. | F02D 35/02 701/102 |
| 2009/0187325 | A1* | 7/2009 | Loeffler ................ | F02D 35/028 701/102 |
| 2010/0089364 | A1 | 4/2010 | Flanagan et al. | |
| 2011/0017173 | A1 | 1/2011 | Portin et al. | |
| 2011/0257921 | A1* | 10/2011 | Monferrato ........... | F02D 35/023 702/98 |
| 2012/0046850 | A1 | 2/2012 | Yasuda et al. | |
| 2012/0123666 | A1 | 5/2012 | Stoffels et al. | |
| 2013/0298869 | A1* | 11/2013 | Hirzinger .............. | F02D 35/023 123/395 |

FOREIGN PATENT DOCUMENTS

| | | | |
|---|---|---|---|
| DE | 197 54 353 | | 6/1999 |
| DE | 10 2009 008 247 | B3 | 8/2010 |
| DE | 10 2010 045 689 | | 4/2011 |
| DE | 10 2010 042 736 | | 4/2012 |
| EP | 0 259 382 | | 4/1989 |
| JP | 2005-240712 | | 9/2005 |
| JP | 2010-1745 | | 1/2010 |
| WO | 2009/122012 | A1 | 10/2009 |
| WO | 2012/097389 | A2 | 7/2012 |

OTHER PUBLICATIONS

European Search Report issued Dec. 4, 2013 in corresponding European Application No. 13003562.9.

Austrian Patent Office Search Report (ASR) issued Jul. 18, 2013 in Austrian Patent Application No. A 896/2012.

Chinese Search Report issued Jan. 26, 2016 in corresponding Chinese Application No. 201310357228.1.

* cited by examiner

METHOD FOR OPERATING AN INTERNAL COMBUSTION ENGINE

BACKGROUND OF THE INVENTION

1. Field of the Invention

The invention relates to a method for operating an internal combustion engine, in particular a gas engine, having at least three cylinders, wherein a cylinder-specific signal is acquired from each cylinder, wherein a reference value is generated from the signals from the cylinders, wherein at least one combustion parameter of the corresponding cylinder is controlled as a function of the deviation of a signal from the reference value, whereupon the signal tracks the reference value.

2. Description of Related Art

The cylinders of an internal combustion engine normally exhibit technical differences in combustion, i.e. when combustion parameters such as the quantity of fuel or the ignition point are controlled in an overall manner, the individual contributions by the cylinders to the total work carried out by the internal combustion engine are different. The term "overall control" or "overall engine control" of combustion parameters as used in the context of the invention means that all of the cylinders of an internal combustion engine are operated with the same values for the corresponding variables, i.e., for example, for overall control as regards fuel quantity, the same open period is applied to the gas injection valves for the cylinders, or for overall control as regards the ignition point, the ignition devices of the cylinders are each activated at the same piston position of the respective piston in the cylinder—normally expressed as the crank angle before TDC (top dead center of the piston in the cylinder).

The work of a cylinder in a reciprocating engine is transmitted via a crankshaft connected to a connecting rod of the cylinder to an output shaft of the internal combustion engine, wherein frequently, an electrical generator is connected to the output shaft in order to convert the mechanical energy of the output shaft into electrical energy. Of the various possibilities for cylinder balancing, focus is on balancing the peak pressures in the individual cylinders in order to obtain as even as possible a mechanical peak load on the components. Examples of major alternative balancing variations are optimizing the engine efficiency or minimizing pollutant emissions.

Having regard to cylinder balancing control, U.S. Pat. No. 7,957,889 B2 describes tailoring the introduction of fuel for each cylinder of an internal combustion engine such that the maximum internal cylinder pressure or peak cylinder pressure of each cylinder is set to a common target value with a tolerance band. The target value in that case is obtained from the arithmetic mean of all of the peak cylinder pressures.

By balancing the peak cylinder pressures, each cylinder provides essentially the same contribution to power and thermo-mechanical overloading of individual cylinders can be avoided. Furthermore, fuel metering can give rise to knocking combustion. Thus, it can, for example, be provided that cylinders which exceed a certain knocking intensity do not receive an increased fuel supply in order to avoid more severe knocking and possible mechanical damage.

The systems described until now use the arithmetic mean of cylinder-specific signals such as the peak cylinder pressure as the target variable for cylinder balance control. However, using the arithmetic mean suffers from the disadvantage that large rogue results have a major impact on the arithmetic mean. Thus, for example, cylinders which exhibit poor combustion or for which the cylinder pressure signal is imprecise or wrong—for example due to a defective sensor or aging of the sensors or electromagnetic interference in the signal transmission and/or signal processing—have a significant and above all unwelcome influence on the target value for all peak cylinder pressures.

SUMMARY OF THE INVENTION

Thus, the aim of the invention is to avoid the disadvantages described above and to provide a method for operating an internal combustion engine which is improved compared with the prior art. In particular, the target value or reference value should be more robust for cylinder balance control than in prior art methods.

The invention achieves this aim by means of the claimed features. Advantageous embodiments of the invention are provided in the dependent claims.

Thus, according to the invention, the median of the signals is generated as the reference value.

The median, which is also frequently described as the central value or 0.5 quantile, is a measure of location in a sampling distribution, wherein in the context of the invention, the distribution of the acquired cylinder-specific signals is a sampling distribution. In known control or regulation systems which can form the basis of the control or regulation of an internal combustion engine, no provision is usually made for determining or outputting the median, and thus known methods do not carry this out.

In contrast to the arithmetic mean, in which all values of a sampling distribution are added together and divided by the number of individual values, the median divides the sampling distribution into two halves of equal size. Thus, the median can be determined by initially arranging the signals in increasing signal value order. When the number of signals is odd—for example in case of an odd number of cylinders—then the signal value of the middle signal is the median. If the number of signals is even—for example with an even number of cylinders—then the median can be determined as the arithmetic mean of the two middle signal values of the ordered sampling distribution.

An important property of the median is that it is much more robust as regards rogue results or extremely divergent values within the sampling distribution compared with the arithmetic mean, which is often simply described as the mean or average.

In the proposed solution, then, the arithmetic mean of the signal value is expressly not generated and used as the reference value, but rather, the median of the signal value is generated and used as the reference value.

Preferably, at least one of the following cylinder-specific signals is acquired from each cylinder: internal cylinder pressure, cylinder exhaust temperature, nitrogen oxide emissions, combustion air ratio. In a particular variation, the signal which is acquired is a maximum internal cylinder pressure of a combustion cycle.

In order to obtain a better signal quality and thus a higher control performance, the signal from a cylinder is preferably the temporally filtered signal acquired over 10 to 1000 combustion cycles, preferably 40 to 100 combustion cycles.

In a preferred embodiment of the invention, the combustion parameter of a cylinder may be adjusted if the deviation of the signal from the cylinder from the reference value exceeds a specifiable tolerance value. In this manner, smoother control dynamics can be obtained.

In a particularly preferred embodiment, the combustion parameter may be a quantity of fuel for the corresponding cylinder. In a prechamber ignition internal combustion engine, it may be the fuel quantity for the respective main combustion chamber of a cylinder. The fuel quantity for a cylinder can be increased if the signal from the cylinder is smaller than the reference value, and the fuel quantity for a cylinder can be reduced if the signal from the cylinder is larger than the reference value. Preferably, a fuel metering valve can be provided for each cylinder wherein, in order to adjust the fuel quantity for a cylinder, the open period for the corresponding fuel metering valve is adjusted. Such a fuel metering valve is advantageously a port injection valve which is disposed in the inlet tract region of a cylinder. Port injection valves may also be used in this case which, for example, have only a completely open or a completely closed position. In this manner, the open period can be defined as the period of time in which the valve is in its completely open position. In general, however, stroke-controlled valves may be used in which, in order to adjust the fuel quantity for a cylinder, the open period and/or the opening stroke of a valve is adjusted.

Control of the fuel quantity combustion parameter can thus be carried out in accordance with Table 1 below, as a function of the cylinder-specific signal. Column 1 of Table 1 lists the respective cylinder-specific signal and an appropriate scenario for acquiring the respective signal. According to column 2 of Table 1, an increase in the fuel quantity for a cylinder occurs if the respective signal from the cylinder is smaller than the reference value. According to column 3 of Table 1, the fuel quantity for a cylinder is reduced if the respective signal from the cylinder is larger than the reference value. In each case, the reference value is the median of the respective signals from all of the cylinders of the internal combustion engine. The fuel quantity can thus be increased for a cylinder by, for example, increasing the open period of a fuel metering valve associated with the cylinder. Correspondingly, the fuel quantity for a cylinder can be reduced by reducing the open period for the fuel metering valve associated with the cylinder.

TABLE 1

| Control interventions regarding fuel quantity | | |
|---|---|---|
| Cylinder-specific signal | Increase fuel quantity for a cylinder in the event of | Reduce fuel quantity for a cylinder in the event of |
| Peak cylinder pressure, acquired by cylinder pressure sensor in combustion chamber | Lower peak cylinder pressure | Higher peak cylinder pressure |
| Cylinder exhaust temperature, acquired by thermocouple after outlet valve | Lower cylinder exhaust temperature | Higher cylinder exhaust temperature |
| Nitrogen oxide emissions, acquired by NO*x* probe | Lower nitrogen oxide emissions | Higher nitrogen oxide emissions |
| Reciprocal of combustion air ratio, acquired by broad band lambda probe or oxygen sensor | Lower reciprocal of combustion air ratio | Higher reciprocal of combustion air ratio |

In a further preferred embodiment, an ignition point for the corresponding cylinder may be set as the combustion parameter. Preferably, an ignition device is provided for each cylinder, wherein the ignition point for the ignition device is set in degrees of crank angle before TDC (top dead center of piston in cylinder).

The ignition point is usually expressed in degrees of crank angle before TDC (top dead center of piston in cylinder) and indicates when an appropriate ignition device is fired in order to ignite a fuel or fuel-air mixture in the cylinder or combustion chamber. The ignition device in this case may be a spark plug (for example an electrode spark plug or laser spark plug) or a pilot injector in order to carry out pilot injection of diesel fuel, for example. The ignition device may also be a prechamber. Normally, the ignition point for each cylinder of an internal combustion engine is set with the same overall predetermined value (overall default value)—expressed as the crank angle before TDC. As an example, this value is 20 to 30 degrees of crank angle before TDC, wherein the value can be established from the speed of the internal combustion engine and/or as a function of the ignition device employed. This overall default value can be deduced from an ignition point characteristic mapping which sets out appropriate values for the ignition point as a function of power and/or charge air pressure and/or charge air temperature and/or engine speed of the internal combustion engine.

In a preferred embodiment of the invention, it can be provided that the ignition point for a cylinder is set earlier (with respect to the overall default value) if the signal from the cylinder is smaller than the reference value and the ignition point for a cylinder is set later (with respect to the overall default value) if the signal from the cylinder is larger than the reference value.

Control in respect of the ignition point combustion parameter may thus be carried out as a function of the cylinder-specific signal used in accordance with Table 2 below. In Table 2, column 1 lists the respective cylinder-specific signal and an appropriate scenario for acquiring the respective signal. Column 2 of Table 2 sets out an earlier ignition point for a cylinder if the respective signal of the cylinder is smaller than the reference value. Column 3 of Table 2 sets out a later ignition point if the respective signal of the cylinder is larger than the reference value. In each case, the reference value is the median of the respective signals from all of the cylinders of the internal combustion engine.

TABLE 2

| Control interventions regarding ignition point | | |
|---|---|---|
| Cylinder-specific signal | Set ignition point for a cylinder earlier in the event of | Set ignition point for a cylinder later in the event of |
| Peak cylinder pressure, acquired by cylinder pressure sensor in combustion chamber | Lower peak cylinder pressure | Higher peak cylinder pressure |
| Nitrogen oxide emissions, acquired using NO*x* probe | Lower nitrogen oxide emissions | Higher nitrogen oxide emissions |

According to a particularly preferred embodiment, it can be provided that in order to set the at least one combustion parameter, a parameter is determined wherein preferably, the value of the parameter comprises a specifiable overall engine target value and a cylinder-specific difference value.

In the case of setting the ignition point combustion parameter, the cylinder-specific difference value may be in the range ±4 degrees of crank angle before TDC, preferably in the range ±2 degrees of crank angle before TDC.

The specifiable target value may be an overall value which is the same for all cylinders of the internal combustion engine.

In the case of setting the ignition point as a combustion parameter, the specifiable target value may be an overall default value for the ignition point in the cylinders of a stationary gas engine. In this respect, the specifiable target value may be deduced from an ignition point characteristic mapping. The ignition point characteristic mapping can set out appropriate values for the ignition point as a function of the power and/or the charge air pressure and/or the charge air temperature and/or the engine speed of the internal combustion engine. The values set out in the ignition point characteristic mapping may be determined on a test rig.

In the case of setting the fuel quantity as the combustion parameter, the specifiable target value may be an overall basic engine value for the open periods of fuel metering valves or gas injection valves for the cylinder of a stationary gas engine.

Basically, combustion processes in internal combustion engines can be categorized into air-led and fuel-led combustion processes. In an air-led combustion process, a fuel quantity to be metered is determined, for example, as a function of the duty point of the internal combustion engine and a specifiable target value for the fuel-air ratio, in order to obtain a specific emission level or a specific charge air pressure. The engine controls deployed thereby usually comprise an emission controller. In a fuel-led or gas-led combustion process, the fuel quantity to be metered is determined as a function of the duty point of the internal combustion engine and a specifiable target value for the power and/or the speed of the internal combustion engine. Fuel-led combustion processes are of particular application during variable speed operation of an internal combustion engine, in an internal combustion engine in isolated operation, during engine start-up or when the internal combustion engine is idling. The engine controls deployed thereby usually comprise a power controller and/or a speed controller.

In the case of air-led combustion processes in which an emission controller is used, for example, it can preferably be provided that the specifiable target value is determined from a specifiable fuel-air ratio wherein preferably, the specifiable fuel-air ratio is determined from a power equivalent for the output power of the internal combustion engine, preferably electrical power from a generator linked to the internal combustion engine, and/or from a charge air pressure and/or from an engine speed of the internal combustion engine.

The term "power equivalent" as used in the context of this invention should be understood to mean the actual mechanical power of the internal combustion engine or a substitute variable corresponding to the mechanical power. An example of this may be electrical power from a generator linked to the internal combustion engine, which is measured from the power output of the generator. It may also be mechanical power computed for the internal combustion engine, which is calculated from the engine speed and torque or from the electrical power of the generator and the efficiency of the generator. It may also simply be the engine speed if the power uptake of the consumer is precisely known from the speed. Furthermore, the power equivalent may also be the indicated mean pressure which can be determined in known manner from the internal cylinder pressure profile, or it may be the effective mean pressure, which can be calculated from the output torque or from the electrical or mechanical power. In this regard, a power equivalent for the internal combustion engine can be determined from the known relationship between the effective mean pressure, the cylinder capacity and the work obtained from a power stroke.

The specifiable fuel-air ratio can be determined in known manner from the charge air pressure and the power of the internal combustion engine. In this manner, the specifiable fuel-air ratio for an internal combustion engine constructed as a gas engine may be determined, for example, in accordance with EP 0 259 382 B1.

The specifiable target value for the gas injection period can be determined from the flow behavior of the gas injection valves and the boundary conditions prevailing in the gas injection valves (for example pressure and temperature of the combustion gas, intake manifold pressure or charge air pressure). The air mass equivalent (a value corresponding to the air mass) of the gas engine can be determined from the conditions in the intake manifold of the gas engine, in particular from the charge air pressure and the charge air temperature. Using the specifiable fuel-air ratio, the reference value for the mass of combustion gas can be determined. The required overall open period or gas injection period for the gas injection valves can be determined from the flow behavior of the gas injection valves and the boundary conditions at the gas injection valves in order to introduce the previously determined mass of combustion gas into the gas engine. In this example, the overall gas injection period corresponds to the specifiable target value.

For gas-led combustion processes which, for example, employ a power controller and/or a speed controller, it can preferably be provided that the specifiable target value is determined as a function of the deviation of a power equivalent of the output power of the internal combustion engine from a specifiable target power equivalent and/or as a function of the deviation of an engine speed of the internal combustion engine from a specifiable target speed of the internal combustion engine.

In this manner, a power controller can be provided which, as a function of the deviation of an actual power equivalent of the output power (actual power) of the internal combustion engine (for example electrical power measured for a generator connected to the internal combustion engine) from the specifiable target power equivalent (reference power) of the internal combustion engine, can determine an overall engine default value for the fuel mass flow. Alternatively or in addition, a speed controller may be provided which determines an overall engine default value for the fuel mass flow as a function of the deviation of an actual engine speed (actual speed) of the internal combustion engine from the specifiable target speed (reference speed) of the internal combustion engine. From the determined target value for the fuel mass flow, the specifiable target value—for example for the overall engine open period of fuel metering valves or for the overall engine default value for the ignition point of ignition devices—can be determined.

In a particular variation, the cylinder-specific difference value contains a cylinder-specific pilot value, wherein preferably, the cylinder-specific pilot value is determined from a charge air pressure and preferably, in addition, from a charge air temperature of the internal combustion engine. In this manner, the cylinder-specific pilot values can be derived from measurements during placing the internal combustion engine into operation and, for example, can also be used as fallback values in the event that a sensor for acquiring the cylinder-specific signal fails or is faulty.

The cylinder-specific pilot values may, for example, take into account the gas dynamics in the intake manifold and/or in the gas rail of a gas engine as well as appropriate component tolerances, wherein the gas dynamics can be determined from simulations or measurements. The gas dynamics and the impact of component tolerances are influenced, inter alia, by the charge air pressure, the engine speed and the charge air temperature. In this regard, it is advantageous to derive appropriate cylinder-specific pilot values from a characteristic mapping which contains corresponding values for different charge air pressures and charge air temperatures. In this manner, when placing the gas engine into operation, appropriate measured data can be acquired or appropriate characteristic mappings can be determined by tests or simulations. It is also possible to generate an adaptive characteristic mapping by online measurements during the operation of the gas engine.

Particularly advantageously, the cylinder-specific difference value is supplemented by an equalization value, wherein the equalization value corresponds to the arithmetic mean of the cylinder-specific difference values. This is particularly advantageous when installing or retro-fitting the proposed solution in internal combustion engines which until now have been operated without cylinder balancing or only with a general controller. By correcting the cylinder-specific difference values in this manner, in particular, an overall metered fuel quantity may not be influenced by the proposed solution and the overall emission control of the internal combustion engine does not have to be adjusted. Since the values for the respective ignition points can also be introduced into an overall engine control, correcting the cylinder-specific difference values also means that an unwanted impact on an overall engine control can be avoided in respect of setting the ignition point.

In a preferred embodiment of the invention, a combustion condition can be monitored for each cylinder and can be evaluated as being normal or abnormal with respect to a specifiable reference state, wherein the combustion parameter of a cylinder is only adjusted if the combustion condition of the cylinder is judged to be normal. In this manner, knocking and/or auto-ignition and/or combustion interruptions as the combustion condition can be monitored, wherein the combustion condition of a cylinder is judged to be normal if no knocking and/or no auto-ignition and/or no interruptions are discerned in the combustion.

BRIEF DESCRIPTION OF THE DRAWINGS

Further details and advantages of the present invention will now be provided with the aid of the accompanying description of the drawings, in which.

DETAILED DESCRIPTION OF THE INVENTION

Figure 1A:
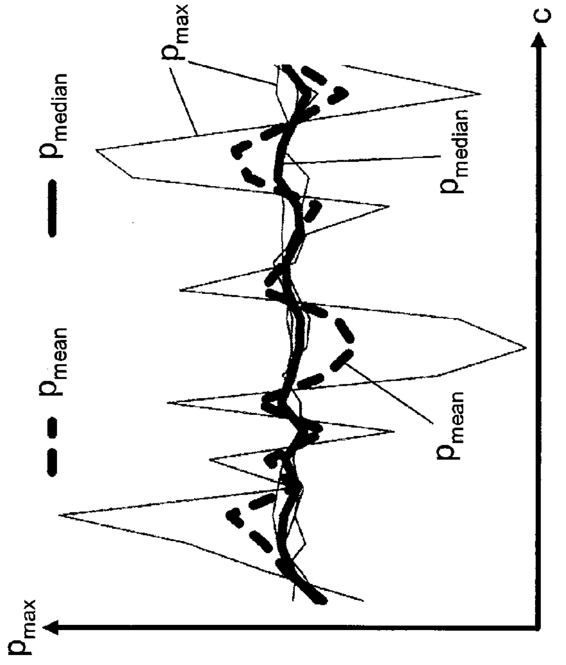
FIG. 1*a* shows the internal cylinder pressure profile of a plurality of cylinders of an internal combustion engine over a plurality of combustion cycles and the arithmetic means and medians obtained therefrom.

FIG. 1*a* shows, as an example, as cylinder-specific signal the respective profile of the maximum internal cylinder pressure or peak cylinder pressure $p_{max}$ over a plurality of combustion cycles c of a plurality of cylinders 2 of an internal combustion engine 1. In prior art methods for cylinder balancing, for each combustion cycle c, the respective arithmetic mean $p_{mean}$ for the acquired cylinder-specific signals $p_{max}$ is generated and is used as the command variable for control. In this manner, rogue results have a significant effect on the command variable and thus on the total cylinder balancing control.

In the proposed method, in contrast, the arithmetic mean of the cylinder-specific signals $p_{max}$ is not used, but rather the median or central value $p_{median}$ is produced as the reference value. This reference value $p_{median}$ then constitutes the command variable for the cylinder balancing control. By using the median of all cylinder-specific signals $p_{max}$, a more stable target value for configuring a combustion parameter is generated, for example the fuel quantity or the gas metering for each individual cylinder 2. The influence of individual peak cylinder pressures with distorted measurements can thus be minimized. In this manner, more stable and more precise cylinder balancing can be obtained, since the reference value $p_{median}$ suffers from smaller fluctuations. In addition, using the median, particularly in transient engine operations (for example jumps in the load), means that better balancing of the cylinders 2 is obtained. This is particularly the case when the cylinder-specific signal used is a signal for the acquired signal $p_{max}$ which is temporally filtered over a plurality of combustion cycles c. The better stability of the median compared with the arithmetic mean can thus also be used to shorten the filter times over a plurality of combustion cycles c.

Figure 1B:
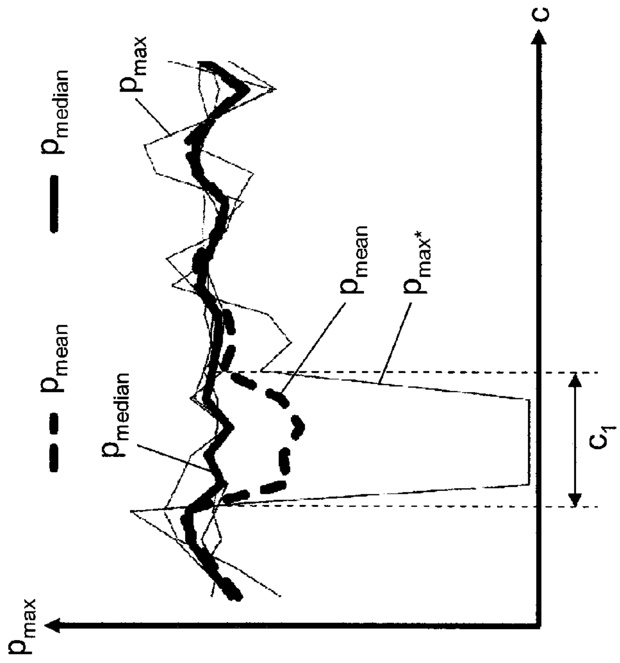
FIG. 1*b* shows an illustration which is similar to FIG. 1*a* with a faulty cylinder pressure signal from an internal cylinder pressure sensor of a cylinder.

FIG. 1*b* shows an illustration similar to that of FIG. 1*a*, wherein the signal $p_{max}$* from a cylinder 2 of the internal combustion engine 1 comprises a distorted value due to a faulty internal cylinder pressure sensor 4. With control involving the arithmetic mean of the prior art, the derived command variable $p_{mean}$ is greatly influenced by the distortion of individual sensor signals. With such a control using the arithmetic mean $p_{mean}$, in the case shown—at least in the faulty combustion cycle zone $c_1$—the fuel dosage would be reduced for each cylinder with a plausible peak cylinder pressure $p_{max}$ and for the cylinder 2 with the distorted signal $p_{max}$*, the fuel dosage would be increased. With such a control involving the arithmetic mean $p_{mean}$ of the peak cylinder pressure $p_{max}$, then, individual distorted signals $p_{max}$* result in a significant unbalancing of all cylinders 2.

However, if the median of the peak cylinder pressures $p_{max}$ is used as the target parameter or reference value $p_{median}$ in accordance with the proposed method, then the reference value $p_{median}$ would only be slightly influenced by a distorted signal $p_{max}$* or even not influenced at all. Only the cylinder 2 with the distorted signal $p_{max}$* could experience control deviations; balancing all of the other cylinders 2 would be ensured, however.

In total, the proposed median-based cylinder balancing results in more robust engine control with greater precision and simultaneously improved behavior in transient engine operation.

Figure 2:
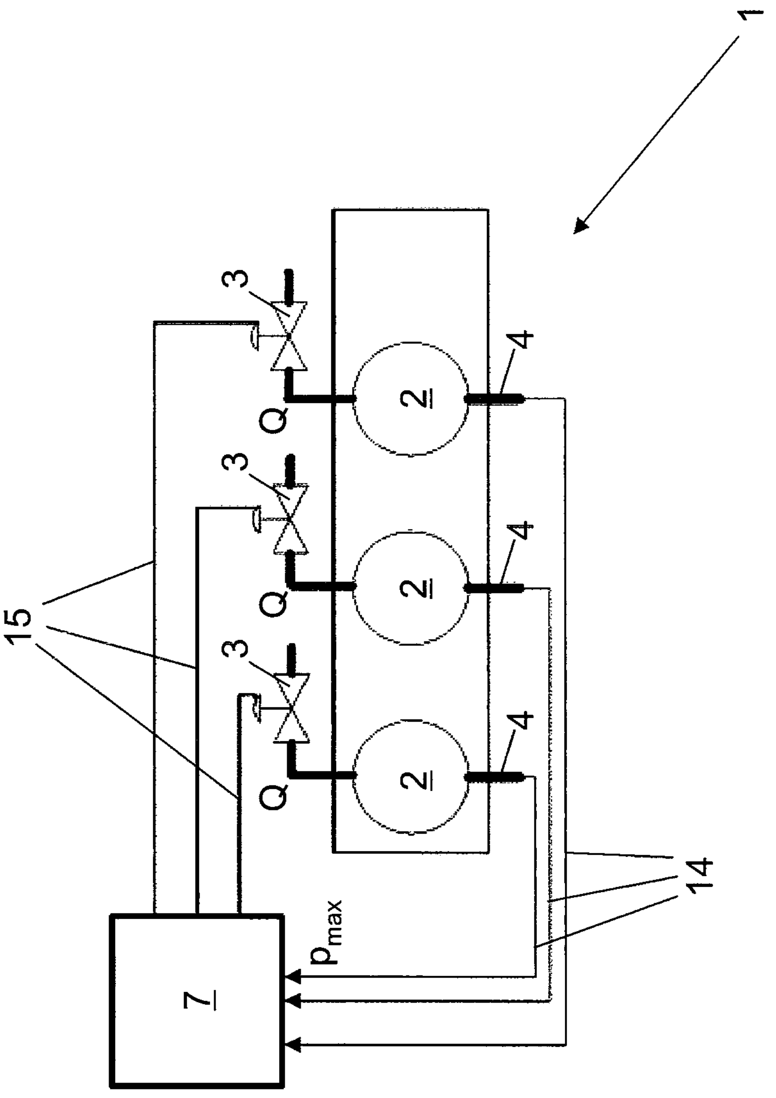
FIG. 2 shows an internal combustion engine with a plurality of cylinders and a control device for operating the internal combustion engine in accordance with an embodiment of the proposed method.

FIG. 2 shows an internal combustion engine 1 with three cylinders 2. A cylinder pressure sensor 4 is associated with each cylinder 2 in order to acquire a cylinder-specific signal. The cylinder-specific signal may be the profile over time of the internal cylinder pressure $p_{cyl}$ or the maximum internal cylinder pressure $p_{max}$ over a combustion cycle c. The cylinder-specific signal may also be a temporally filtered signal of the maximum internal cylinder pressure $p_{max}$ over a plurality of combustion cycles c, for example over 10 to 1000 combustion cycles c, preferably over 40 to 100 combustion cycles c. The cylinder-specific signal acquired from a cylinder 2 is transmitted via a signal line 14 to a control device 7. The control device 7 can also carry out the determination of the maximum internal cylinder pressure $p_{max}$ over a combustion cycle c or temporal filtering of the maximum internal cylinder pressure $p_{max}$ over a plurality of combustion cycles c. As will be described below, the control device 7—according to the proposed method—determines a respective cylinder-specific fuel quantity Q to be metered as a combustion parameter for the cylinders 2 which is transmitted to the corresponding fuel metering valve 3 via control lines 15. The fuel metering valves 3 dose the corresponding cylinder-specific fuel quantities Q into the cylinders 2 and thus the cylinder-specific signals according to the proposed method track the reference value generated by the control device 7—the median of the cylinder-specific signals.

Figure 3:
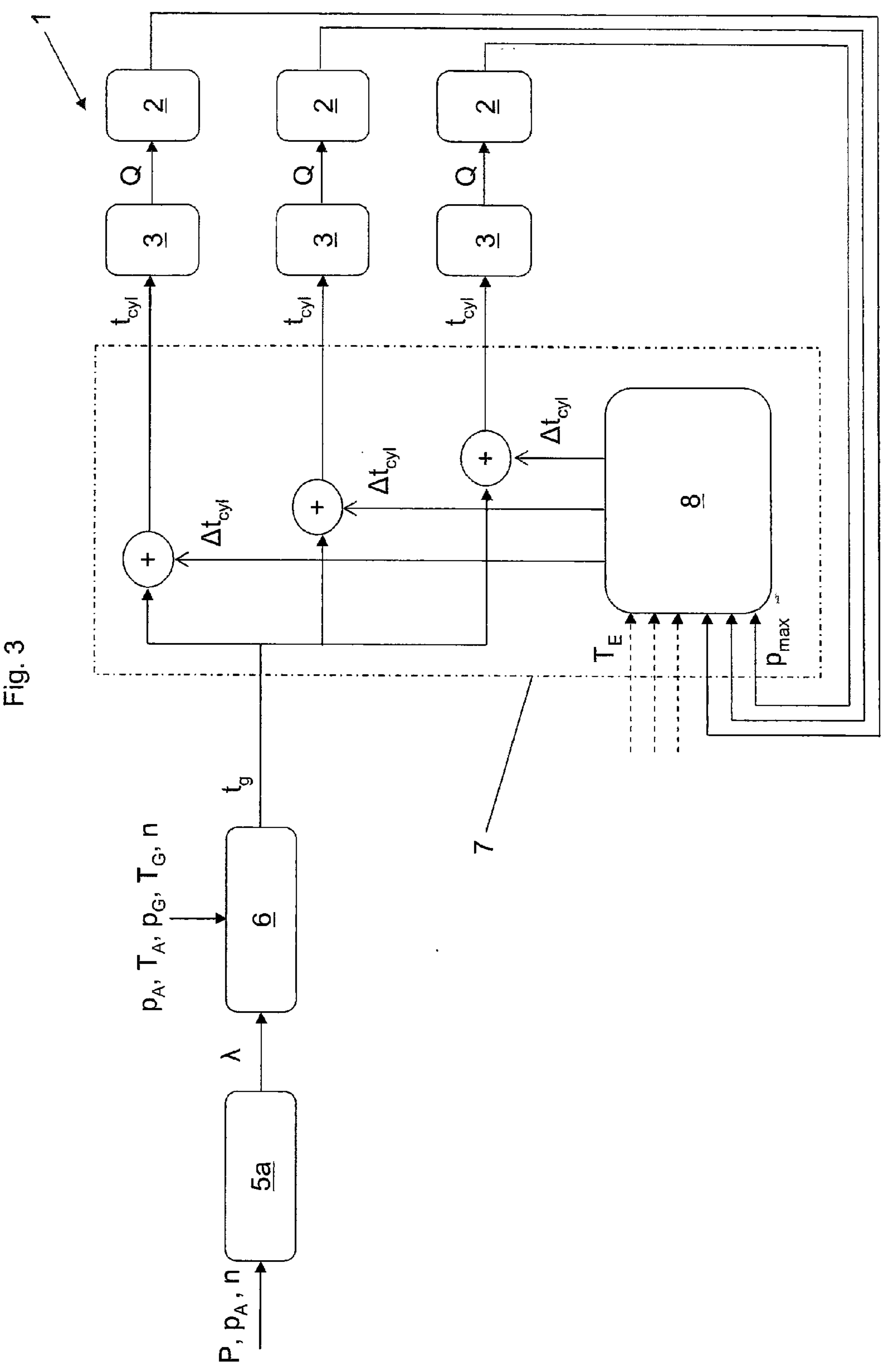
FIG. 3 shows a diagrammatic representation of 3 cylinders of an internal combustion engine and a control device for operating the internal combustion engine in accordance with an embodiment of the proposed method.

FIG. 3 shows a diagrammatic block diagram of three cylinders 2 of an internal combustion engine 1 with an air-led combustion process. A fuel metering valve 3 is associated with each cylinder 2, wherein the fuel quantity Q supplied to the corresponding cylinder 2 can be adjusted by the respective fuel metering valve 3. A control device 7 thus controls the fuel metering valves 3, whereby the control device 7 outputs a respective cylinder-specific open period for the fuel metering valve 3 in the form of a cylinder-specific parameter $t_{cyl}$.

The fuel metering valves 3 in this example are port injection valves which have only a completely open and a completely closed position. When the fuel metering valve 3 is in the completely open position, a fuel in the form of a propellant gas is injected into the inlet tract of the cylinder 2 associated with the fuel metering valve 3. The open period of the fuel metering valve 3 can thus be used to set the fuel quantity Q for the respective cylinder 2.

A cylinder-specific signal $p_{max}$ is acquired from each cylinder 2 and supplied to the control device 7. In this regard, a "cylinder-specific signal $p_{max}$" corresponds to the maximum internal cylinder pressure of the corresponding cylinder 2 during a combustion cycle c. In the example shown, the cylinder-specific signals $p_{max}$ are supplied to a differential value processor 8 of the control device 7. The differential value processor 8 determines a difference value $\Delta t_{cyl}$ for each cylinder 2, or for each fuel metering valve 3, which is respectively added to the specifiable target value $t_g$, whereupon a cylinder-specific open period is generated for each fuel metering valve 3 as a parameter $t_{cyl}$.

The specifiable overall engine target value $t_g$ in the example shown is determined from a specifiable fuel-air ratio $\lambda$, wherein the specifiable fuel-air ratio $\lambda$ is determined by an emission controller 5*a* from a power equivalent P of the output power of the internal combustion engine 1 (for example the electrical power measured for a generator connected to the internal combustion engine 1) and/or from a charge air pressure $p_A$ and/or from an engine speed n of the internal combustion engine 1. In addition to the fuel-air ratio X, in a target value processor 6, the pressure $p_A$ and the temperature $T_A$ of the charge air, the pressure $p_G$ and the temperature $T_G$ of the fuel supply as well as the engine speed n of the internal combustion engine 1 may also be input. Furthermore, yet another flow parameter of the fuel metering valve 3 (for example the effective diameter of flow in accordance with the polytropic outflow equation or a Kv value) as well as fuel or combustion gas characteristics (for example the gas density, the polytropic exponent or the calorific value) can be input into the target value processor 6. The target value processor 6 then determines the specifiable target value $t_g$, which corresponds to an overall engine open period base value for the open periods of all of the fuel metering valves 3.

By means of the difference value processor 8, a cylinder-specific open period offset or difference value $\Delta t_{cyl}$ is determined for each individual fuel metering valve 3. These cylinder-specific difference values $\Delta t_{cyl}$ are dependent on the deviation of the peak cylinder pressure $p_{max}$ of the respective cylinder 2 from the median $p_{median}$ of the peak cylinder pressures $p_{max}$ of all of the cylinders 2. The respective sum of the overall engine open period base value $t_g$ and the cylinder-specific open period offset $\Delta t_{cyl}$ generates the target open period $t_{cyl}$ for the respective fuel metering valve 3 controlled by the drive electronics.

Alternatively or in addition to using the maximum internal cylinder pressure $p_{max}$ as the cylinder-specific signal, the use of the respective cylinder-specific cylinder exhaust temperature $T_E$ is indicated in dashed lines. In this manner, again, deviations in the cylinder-specific cylinder exhaust temperatures $T_E$ from the median of the cylinder exhaust temperatures $T_E$ over all of the cylinders 2 can be used to calculate the corresponding cylinder-specific open period offsets $\Delta t_{cyl}$. The cylinder-specific cylinder exhaust temperatures $T_E$ may be used as an alternative, for example, when no internal cylinder pressure sensors 4 have been installed or also as a fallback position if the cylinder pressure signals fail, in order to increase the availability of the internal combustion engine 1 in the case of a cylinder pressure sensor failure.

Figure 4:
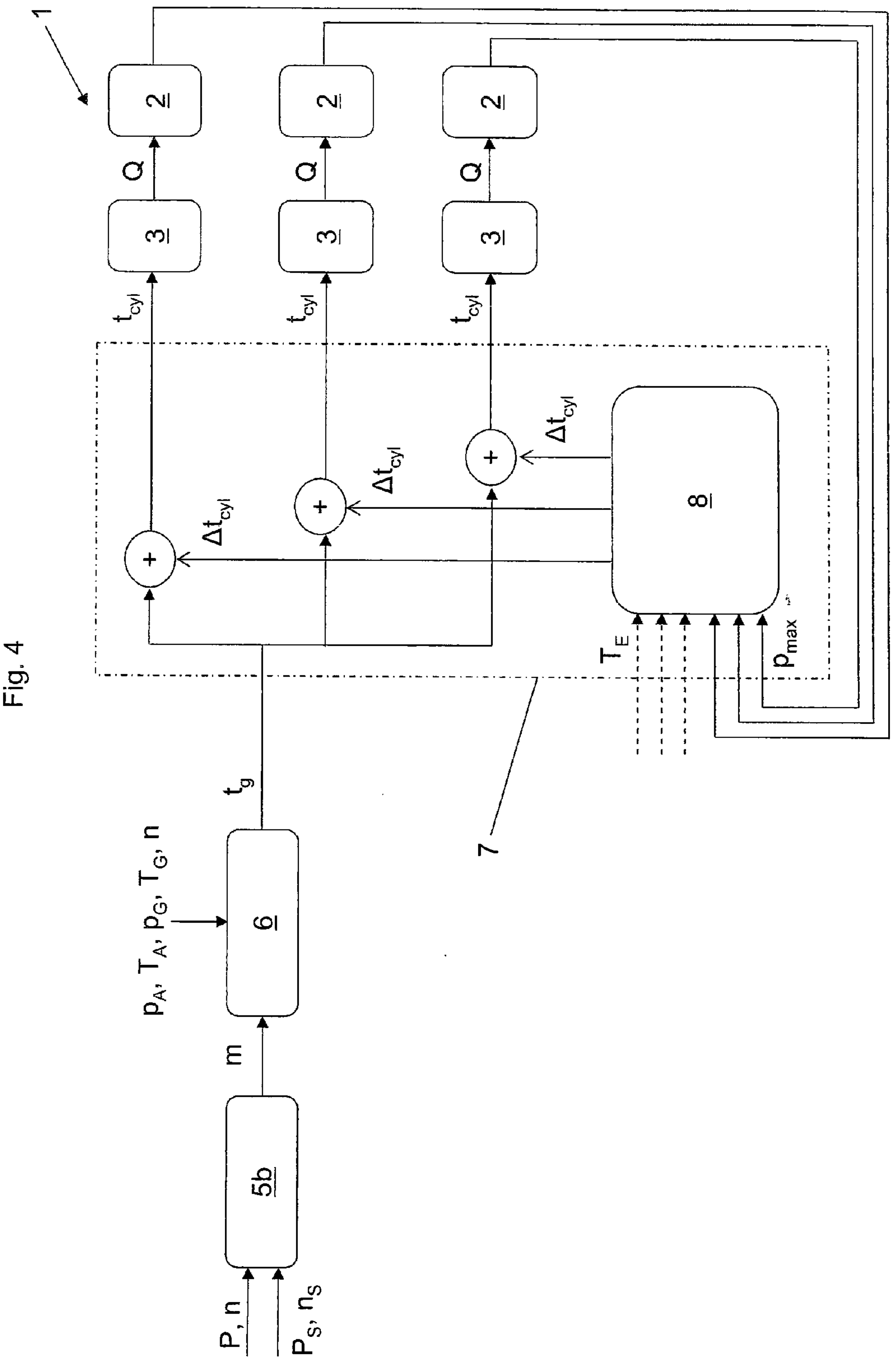
FIG. 4 shows a diagrammatic representation similar to FIG. 3 with an internal combustion engine with a fuel-led combustion process.

FIG. 4 shows a block diagram similar to FIG. 3, wherein in this case the internal combustion engine 1 is powered by a gas-led combustion process. The specifiable overall engine target value $t_g$ in the example shown is determined by a controller 5*b* which can comprise a power controller and/or a speed controller. For the power controller, in addition to a power equivalent P for the output power of the internal combustion engine 1 (actual power), a specifiable target power equivalent $P_S$ (reference power) of the internal combustion engine 1 can serve as the input variable, and for the speed controller, in addition to a respective actual engine speed n (actual speed) of the internal combustion engine 1, a specifiable target speed $n_X$ (reference speed) of the internal combustion engine 1 can serve as the input variable. In the controller 5*b*, an overall engine default value for the fuel mass flow m is determined, from which subsequently, in a target value processor 6 the specifiable overall engine target value $t_g$—for example for the overall engine open period of fuel metering valves or for the overall engine default value for the ignition point of ignition devices—is determined.

Figure 5:
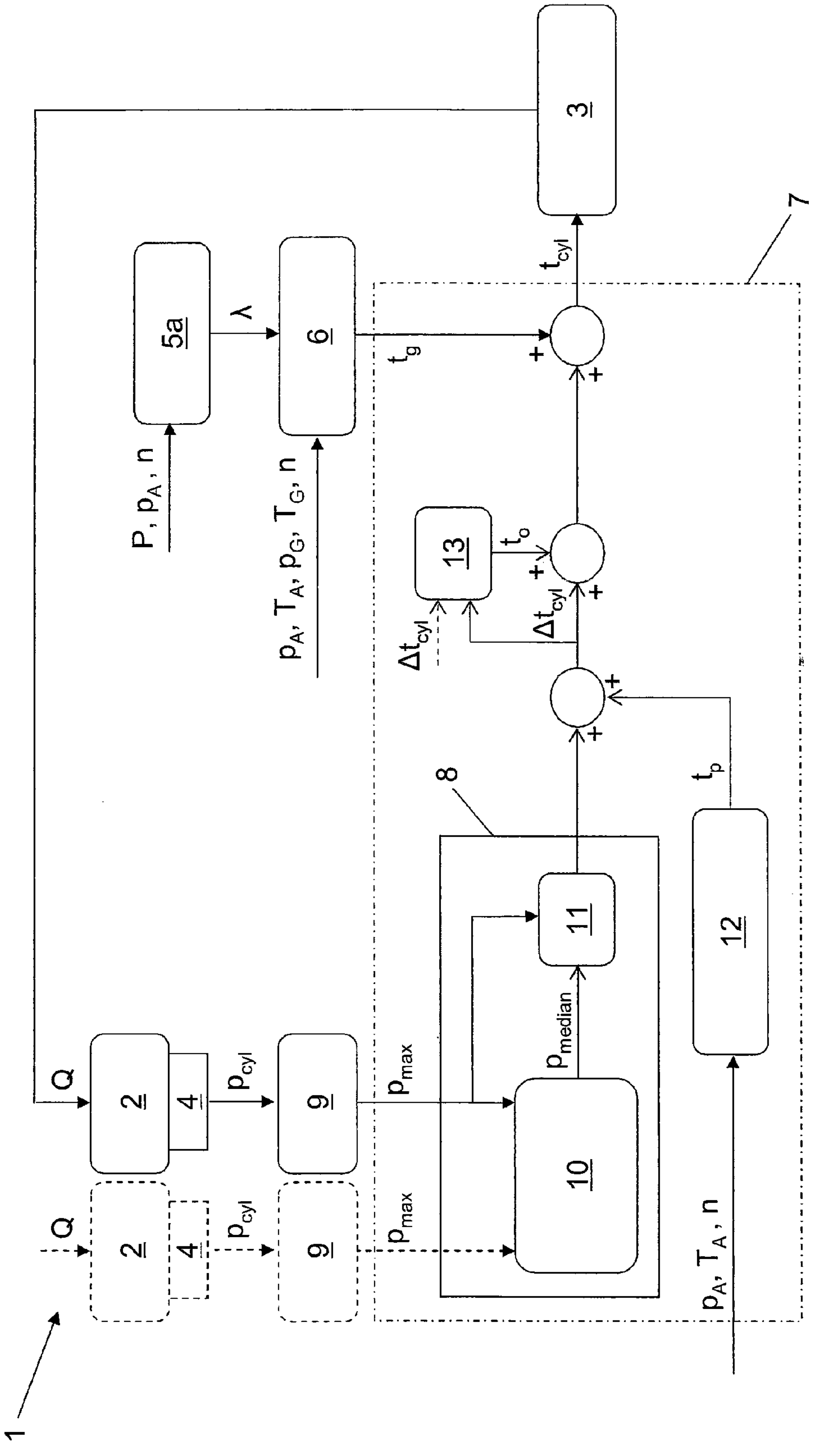
FIG. 5 shows a diagrammatic detailed representation of a proposed control device.

FIG. 5 shows a block diagram similar to FIG. 3, wherein the control device 7 as well as the difference value processor 8 are shown in more detail. This representation shows details of the control procedure for just one cylinder 2 of the internal combustion engine 1. Other cylinders 2 of the internal combustion engine 1 are shown here as dashed lines.

An internal cylinder pressure sensor 4 is associated with each cylinder 2. An internal cylinder pressure sensor 4 can thus acquire the profile of the internal cylinder pressure $p_{cyl}$ over a combustion cycle c. A maximum acquired value processor 9 can thus determine the maximum internal cylinder pressure $p_{max}$ or the peak pressure of the respective cylinder 2 in the preceding combustion cycle c.

The peak pressures of all cylinders 2 are supplied to a reference value processor 10 as cylinder-specific signals $p_{max}$. This reference value processor 10 generates the median from the cylinder-specific signals $p_{max}$ and outputs it as the reference value $p_{median}$. In a reference value controller 11, the deviation of the signal $p_{max}$ of a cylinder 2 from the reference value $p_{median}$ is determined and subsequently, a difference value $\Delta t_{cyl}$ is determined for the fuel metering valve 3 associated with the cylinder 2. The respective difference value $\Delta t_{cyl}$ is then added to an overall engine specifiable target value $t_g$, whereupon an open period for the fuel metering valve 3 is generated as a parameter $t_{cyl}$. The specifiable target value $t_g$ is determined, as described in FIG. 3, from an emission controller of the internal combustion engine 1. It can basically also be determined from a power controller and/or from a speed controller (as described in FIG. 4) of the internal combustion engine 1.

In the example shown, the respective difference value $\Delta t_{cyl}$ comprises a cylinder-specific pilot value $t_p$, which is determined by means of a pilot value computation 12 from the charge air pressure $p_A$ and/or the charge air temperature $T_A$ and/or the engine speed n of the internal combustion engine 1. This respective pilot value $t_p$ can, for example, be determined by measurements during placing the internal combustion engine into operation and set out in a characteristic mapping.

In general, the reference value controller 11 can, for example, be a P-, PI- or PID controller. However, other controller concepts and controller types may be used, for example a LQ controller, a robust controller or a fuzzy controller.

In order to avoid unwanted consequences for the overall engine control, and in particular the emission controller 5*a*, the respective difference values $\Delta t_{cyl}$ are in addition provided with an equalization value $t_o$ from an equalization value processor 13. This equalization value $t_o$, which is the same for all difference values $\Delta t_{cyl}$, corresponds to the arithmetic mean of the difference values $\Delta t_{cyl}$ of all cylinders and can be positive or negative. Thus, it is possible to apply the proposed method to internal combustion engines 1 which until now have been operated without cylinder balancing or only with a general controller, without this additional control having an impact on the overall engine control.

Figure 6:
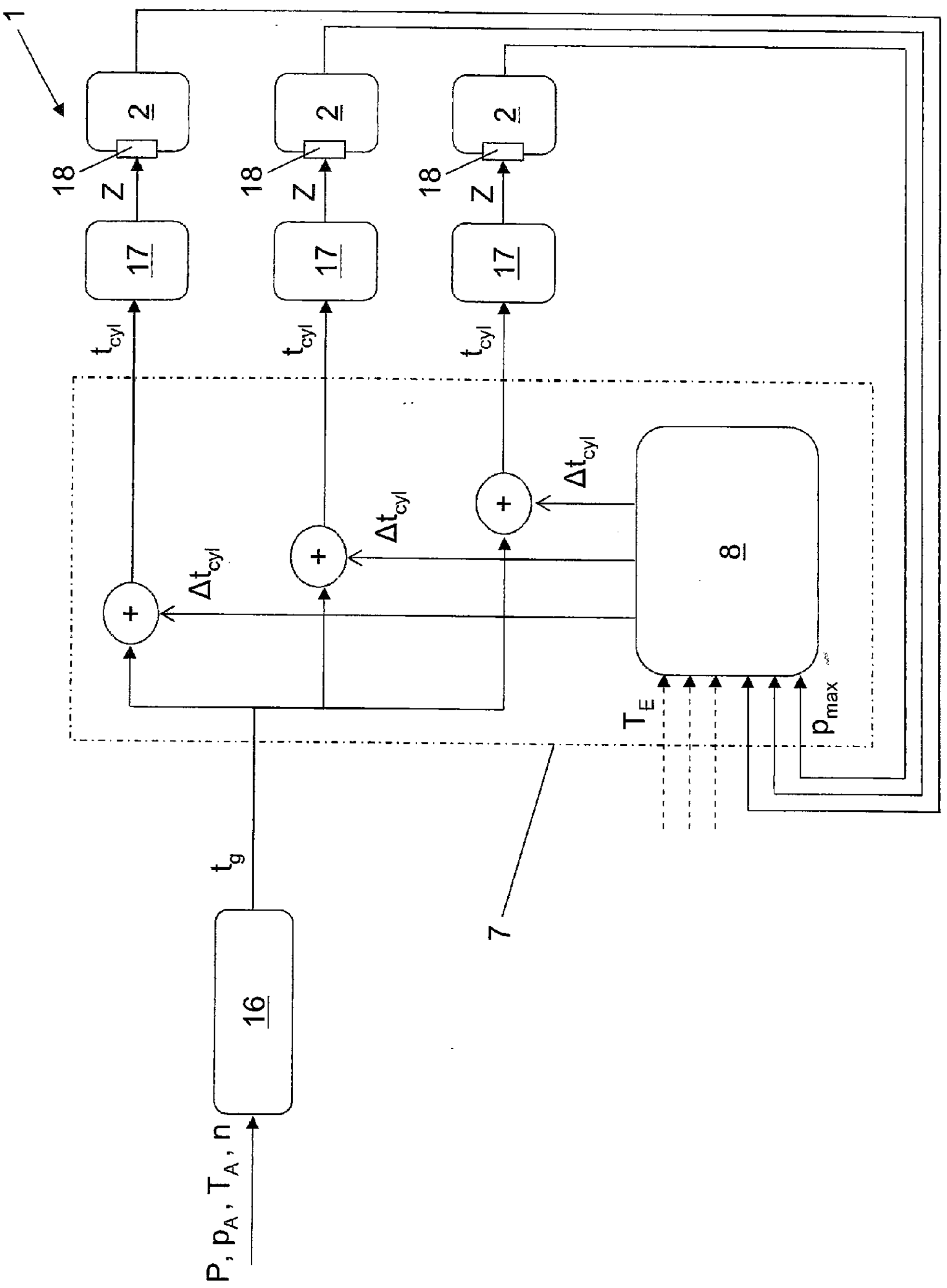
FIG. 6 shows a diagrammatic representation similar to FIG. 3 of a further embodiment of the proposed method.

FIG. 6 shows a diagrammatic block schematic similar to FIG. 3, but in the illustrated embodiment of the invention, the ignition points Z from ignition devices 18 arranged at or in the cylinders 2 rather than the fuel quantities Q for the cylinder 2 are set. The overall specifiable target value $t_g$ (overall default value) for the ignition point Z in this case is determined from an ignition point characteristic mapping 16, in which ignition point characteristic mapping 16 suitable values are presented for the overall default value $t_g$ as a function of the power or the power equivalent P and/or the charge air pressure $p_A$ and/or the charge air temperature $T_A$ and/or the engine speed n of the internal combustion engine 1. The respective parameter $t_{cyl}$ determined by the control device 7—expressed in degrees of crank angle before TDC—is sent to an ignition controller 17. The ignition controller 17 activates the respective ignition device 18 at the given ignition point Z. In this manner, in this example the ignition point Z of a cylinder 2 is set earlier with respect to the overall default value $t_g$ if the peak cylinder pressure $p_{max}$ of the cylinder 2 is smaller than the reference value $p_{median}$, and the ignition point Z of a cylinder 2 is set later with respect to the overall default value $t_g$ if the peak cylinder pressure $p_{max}$ of the cylinder 2 is larger than the reference value $p_{median}$.

Figure 7:
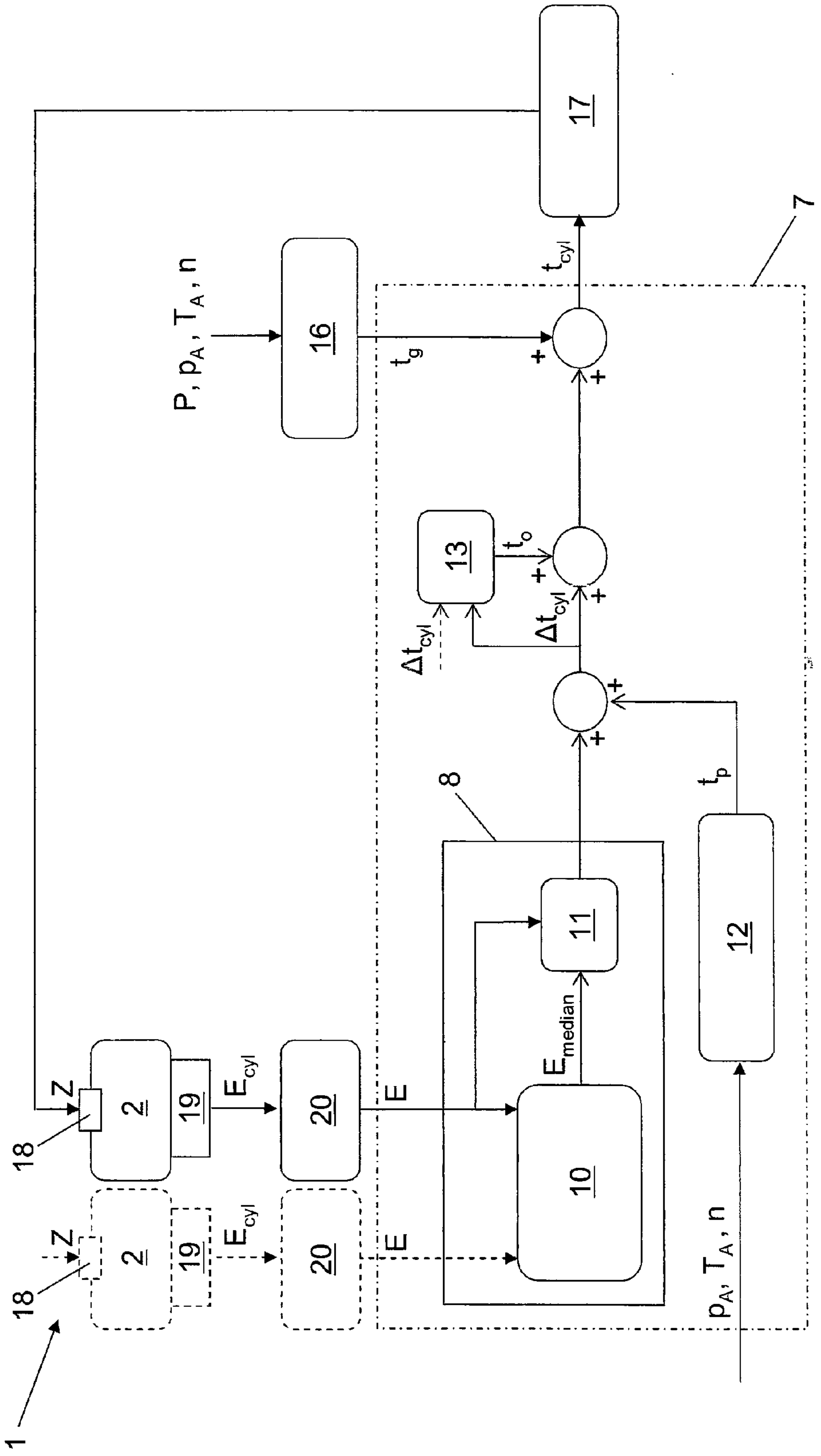
FIG. 7 shows a detailed diagrammatic representation of a control device of a further embodiment of the proposed method.

FIG. 7 shows a diagrammatic block schematic of a further embodiment of the invention which is similar to that of FIG. 5, but the ignition points Z of the ignition devices 18 on or in the cylinders 2 rather than the fuel quantities Q for the cylinder 2 are set. In this example, the nitrogen oxide emissions $E_{cyl}$ of a cylinder 2 are acquired over a combustion cycle c from a NOx probe 19 and sent to an analytical unit 20. From the temporal profile of the nitrogen oxide emissions $E_{cyl}$ over a combustion cycle c, the analytical unit 20 determines a filtered emission value which is sent as the cylinder-specific signal E to the reference value processor 10. The reference value processor 10 generates the median from the cylinder-specific signals E from all cylinders 2 and outputs it as the reference value $E_{median}$ to the reference value controller 11. In the reference value controller 11, the deviation of the cylinder-specific signal E from the reference value $E_{median}$ is determined and as a function thereof, a difference value $\Delta t_{cyl}$ is determined for the ignition point Z of an ignition device 18 associated with the corresponding cylinder 2. The respective difference value $\Delta t_{cyl}$ is then added to the overall engine specifiable target value $t_g$, whereupon an ignition point Z is generated in degrees of crank angle before TDC as the parameter $t_{cyl}$ and sent to an ignition controller 17, whereupon the ignition controller 17 activates the ignition device 18 (for example a spark plug) at the given ignition point Z. The specifiable target value $t_g$ in this regard is determined from an ignition point characteristic mapping 16 as described in FIG. 6.

The invention claimed is:

1. A method for operating an internal combustion engine having at least three cylinders, the method comprising:

acquiring, by a sensor, a cylinder-specific signal ($p_{max}$, E) from each of the at least three cylinders, generating, by a processor, a reference value ($p_{median}$, $E_{median}$) from the cylinder-specific signals ($p_{max}$, E) acquired from the at least three cylinders, and controlling, by a controller, at least one combustion parameter (Q, Z) of one of the at least three cylinders as a function of a deviation of the cylinder-specific signal of the one of the at least three cylinders ($p_{max}$, E) from the reference value ($p_{median}$, $E_{median}$), whereupon the cylinder-specific signal of the one of the at least three cylinders ($p_{max}$, E) follows the reference value ($p_{median}$, $E_{median}$), wherein a median of the cylinder-specific signals ($p_{max}$, E) is generated by the processor as the reference value ($p_{median}$, $E_{median}$).

2. The method according to claim 1, wherein the cylinder-specific signal ($p_{max}$, E) from each of the at least three cylinders is at least one of: an internal cylinder pressure ($p_{cyl}$), a cylinder exhaust temperature ($T_E$), a nitrogen oxide emissions (E) and a combustion air ratio.

3. The method according to claim 2, wherein a maximum internal cylinder pressure ($p_{max}$) of a combustion cycle (c) is acquired as the cylinder-specific signal from each of the at least three cylinders.

4. The method according to claim 1, wherein the cylinder-specific signal from each of the at least three cylinders is a temporally filtered signal ($p_{max}$, E) acquired over 10 to 1000 combustion cycles (c).

5. The method according to claim 1, wherein the at least one combustion parameter (Q, Z) of the one of the at least three cylinders is adjusted if the deviation of the cylinder-specific signal of the one of the at least three cylinders ($p_{max}$, E) from the reference value ($p_{median}$, $E_{median}$) exceeds a specifiable tolerance value.

6. The method according to claim 1, wherein a fuel quantity (Q) for the one of the at least three cylinders is adjusted as the at least one combustion parameter.

7. The method according to claim 6, wherein the fuel quantity (Q) for the one of the at least three cylinders is increased if the cylinder-specific signal of the one of the at least three cylinders ($p_{max}$, E) is smaller than the reference value ($p_{median}$, $E_{median}$).

8. The method according to claim 6, wherein the fuel quantity (Q) for the one of the at least three cylinders is decreased if the cylinder-specific signal of the one of the at least three cylinders ($p_{max}$, E) is larger than the reference value ($p_{median}$, $E_{median}$).

9. The method according to claim 6, wherein a fuel metering valve is provided for each of the at least three cylinders, wherein in order to adjust the fuel quantity (Q) for the one of the at least three cylinders, an open period ($t_{cyl}$) for the fuel metering valve of the one of the at least three cylinders is adjusted.

10. The method according to claim 1, wherein an ignition point (Z) for the one of the at least three cylinders is adjusted as the at least one combustion parameter.

11. The method according to claim 10, wherein the ignition point (Z) for the one of the at least three cylinders is set earlier if the cylinder-specific signal of the one of the at least three cylinders ($p_{max}$, E) is smaller than the reference value ($p_{median}$, $E_{median}$).

12. The method according to claim 10, wherein the ignition point (Z) for the one of the at least three cylinders is set later if the cylinder-specific signal of the one of the at least three cylinders ($p_{max}$, E) is larger than the reference value ($p_{median}$, $E_{median}$).

13. The method according to claim 10, wherein an ignition device is provided for each of the at least three cylinders, wherein the ignition point (Z) for the ignition device is set in degrees of crank angle before TDC ($t_{cyl}$).

14. The method according to claim 1, wherein, in order to set the at least one combustion parameter (Q, Z), a parameter ($t_{cyl}$) comprising a specifiable overall engine target value ($t_g$) and a cylinder-specific difference value ($\Delta t_{cyl}$) is determined.

15. The method according to claim 14, wherein the specifiable overall engine target value ($t_g$) is determined from a specifiable fuel-air ratio ($\lambda$), wherein the specifiable fuel-air ratio ($\lambda$) is determined from a power equivalent (P) of an output power of the internal combustion engine, or from a charge air pressure ($p_A$) of the internal combustion engine or from an engine speed (n) of the internal combustion engine.

16. The method according to claim 14, wherein the specifiable overall engine target value ($t_g$) is determined as a function of a deviation of a power equivalent (P) of an output power of the internal combustion engine from a specifiable target power equivalent ($P_S$) or as a function of a deviation of an engine speed (n) of the internal combustion engine from a specifiable target speed ($n_S$) of the internal combustion engine.

17. The method according to claim 14, wherein the cylinder-specific difference value ($\Delta t_{cyl}$) contains a cylinder-specific pilot value ($t_p$), which is determined from a charge air pressure ($p_A$).

18. The method according to claim 14, wherein the cylinder-specific difference value ($\Delta t_{cyl}$) of each of the at least three cylinders is provided with an equalization value ($t_o$), which corresponds to an arithmetic mean of the cylinder-specific difference values ($\Delta t_{cyl}$).

19. The method according to claim 14, wherein a combustion condition is monitored for each of the at least three cylinders and is evaluated as being normal or abnormal with respect to a specifiable reference state, wherein the at least one combustion parameter (Q, Z) of one of the at least three cylinders is only adjusted if the combustion condition of the one of the at least three cylinders is evaluated as being normal.

20. The method according to claim 19, wherein knocking or auto-ignition or interruptions in combustion are monitored as the combustion condition, wherein the combustion condition of one of the at least three cylinders is evaluated as being normal if no knocking or no auto-ignition or no interruptions in the combustion are discerned.

* * * * *